US009341135B2

(12) United States Patent
Watanuki et al.

(10) Patent No.: US 9,341,135 B2
(45) Date of Patent: May 17, 2016

(54) INTERNAL COMBUSTION ENGINE CONTROL APPARATUS

(71) Applicant: Mitsubishi Electric Corporation, Chiyoda-ku, Tokyo (JP)

(72) Inventors: Takuo Watanuki, Chiyoda-ku (JP); Hideki Hagari, Chiyoda-ku (JP); Tomokazu Makino, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 170 days.

(21) Appl. No.: 14/154,398

(22) Filed: Jan. 14, 2014

(65) Prior Publication Data

US 2015/0013640 A1     Jan. 15, 2015

(30) Foreign Application Priority Data

Jul. 12, 2013   (JP) .................................. 2013-145979

(51) Int. Cl.
| | |
|---|---|
| *F02M 25/07* | (2006.01) |
| *F02D 43/00* | (2006.01) |
| *F02D 41/00* | (2006.01) |
| *F02D 41/18* | (2006.01) |

(52) U.S. Cl.
CPC ............ *F02D 43/00* (2013.01); *F02D 41/0072* (2013.01); *F02D 41/18* (2013.01); *F02D 2200/0404* (2013.01); *F02D 2200/0406* (2013.01); *F02D 2200/0411* (2013.01); *Y02T 10/47* (2013.01)

(58) Field of Classification Search
CPC ................ F02D 2009/0279; F02D 2009/0281; F02D 2009/0284
USPC .......... 701/103, 108; 123/402, 403, 462, 463, 123/478, 480
See application file for complete search history.

(56) References Cited

U.S. PATENT DOCUMENTS

| | | | | |
|---|---|---|---|---|
| 7,305,967 | B1 * | 12/2007 | Hagari | ...................... F02D 9/02 123/403 |
| 2014/0116376 | A1 * | 5/2014 | Hagari | .................. F02D 41/182 123/319 |
| 2014/0261344 | A1 * | 9/2014 | Makino | ............... F02D 41/1446 123/568.26 |

FOREIGN PATENT DOCUMENTS

| | | |
|---|---|---|
| JP | 07-279774 A | 10/1995 |
| JP | 08-303293 A | 11/1996 |

* cited by examiner

*Primary Examiner* — John Kwon
(74) *Attorney, Agent, or Firm* — Sughrue Mion, PLLC; Richard C. Turner

(57) ABSTRACT

There is provided an internal combustion engine control apparatus including an exhaust gas recirculation amount estimation unit that can estimate an EGR flow rate with an accuracy enough to appropriately control an internal combustion engine. An internal combustion engine control apparatus according to the present invention has an exhaust gas recirculation amount estimation unit that learns the relationship between a detected opening degree of an exhaust gas recirculation valve and a calculated effective opening area of the exhaust gas recirculation valve and estimates an exhaust gas recirculation amount, based on the relationship between a control exhaust gas recirculation valve effective opening area calculated based on the learning and an opening degree of the exhaust gas recirculation valve; for controlling an internal combustion engine, the internal combustion engine control apparatus utilizes the exhaust gas recirculation amount estimated by the exhaust gas recirculation amount estimation unit.

6 Claims, 12 Drawing Sheets

FIG. 3

|  |  | Ne | | |
|---|---|---|---|---|
|  |  | 1500 | 3000 | 4500 |
| Pb/Pa | 0.1 | 0.5 | 0.5 | 0.5 |
|  | 0.2 | 0.6 | 0.6 | 0.55 |
|  | 0.3 | 0.7 | 0.7 | 0.65 |
|  | 0.4 | 0.8 | 0.8 | 0.75 |
|  | 0.6 | 0.9 | 0.9 | 0.85 |
|  | 0.8 | 0.95 | 0.92 | 0.9 |
|  | 1 | 0.95 | 0.95 | 0.95 |

FIG. 5

|  |  | $\theta$ sth |
|---|---|---|
| Sth | 10mm² | 5 |
|  | 20mm² | 10 |
|  | 50mm² | 25 |
|  | 100mm² | 35 |
|  | 200mm² | 45 |
|  | 400mm² | 60 |
|  | 800mm² | 80 |

FIG. 6

|  |  | LEARNING VALUE |
|---|---|---|
| Sth | 10mm² | 0.5 |
|  | 20mm² | 1.5 |
|  | 50mm² | 3.5 |
|  | 100mm² | −1 |
|  | 200mm² | −2 |
|  | 400mm² | −2.5 |
|  | 800mm² | −4 |

FIG. 10

|     |      | Segr |
|-----|------|------|
|     | 10%  | 5    |
|     | 20%  | 10   |
| Est | 30%  | 15   |
|     | 40%  | 20   |
|     | 60%  | 25   |
|     | 80%  | 40   |
|     | 100% | 50   |

FIG. 11

|     |      | LEARNING VALUE |
|-----|------|----------------|
|     | 10%  | 0.5            |
|     | 20%  | 1              |
| Est | 30%  | 1.5            |
|     | 40%  | -1             |
|     | 60%  | -2             |
|     | 80%  | -1             |
|     | 100% | -3             | ly VVT), the amount of air taken
INTERNAL COMBUSTION ENGINE CONTROL APPARATUS

BACKGROUND OF THE INVENTION

1. Field of the Invention

The present invention relates to an internal combustion engine control apparatus and more particularly to an internal combustion engine control apparatus provided with an exhaust gas recirculation amount estimation unit fort estimating an exhaust gas recirculation amount utilized in controlling an internal combustion engine.

2. Description of the Related Art

In order to appropriately control an internal combustion engine, it is important to accurately calculate the amount of air taken into a cylinder and to perform fuel control and ignition timing control in accordance with the amount of air taken into the cylinder flow. In general, as the methods of measuring the amount of air taken into a cylinder of an internal combustion engine, there exist two kinds of methods, i.e., a method (hereinafter, referred to as an AFS method) in which an air flow rate is measured by an air flow sensor (hereinafter, referred to as an AFS (Air Flow Sensor)) provided at the upstream side of the throttle valve in an intake pipe of an internal combustion engine and a method (referred to as a S/D (Speed Density) method) in which there is provided an intake manifold pressure sensor for measuring the inner pressure of an intake manifold (hereinafter, referred to as an intake manifold pressure) as the generic name of an intake pipe including a surge tank and the intake manifold, situated at the downstream side of the throttle valve in an intake pipe, and the flow rate of air taken into a cylinder is estimated based on the intake manifold pressure measured by the intake manifold pressure sensor and the rotation speed of the internal combustion engine. In addition, there exist also a method in which these sensors are concurrently provided and the foregoing methods are switched in accordance with the driving state and a method which is an AFS method but utilizes a measured intake manifold pressure.

With regard to fuel control in an internal combustion engine, when feedback control can be performed in such a way that, primarily, a fuel, the amount of which causes a desired air-fuel ratio for a cylinder intake air flow rate, is injected, almost excellent controllability can be obtained; however, ignition timing control needs to be performed at an ignition advance angle which causes an maximum output (referred to as an MBT (Minimum Spark Advance for Best Torque), hereinafter) in accordance with not only the rotation speed of the internal combustion engine and the cylinder intake air flow rate but also other factors such as the temperature of the internal combustion engine, whether or not a knock has occurred, the fuel property, and the exhaust gas recirculation ratio (referred to as an EGR (Exhaust Gas Recirculation) ratio, hereinafter). The EGR ratio denotes the ratio of the EGR amount to the intake air flow rate.

Among the foregoing factors that provide effects to the MBT, for example, the temperature of the internal combustion engine and whether or not a knock has occurred can be detected by a coolant temperature sensor in the internal combustion engine and a knock sensor, respectively; with regard to the fuel property, it can be determined whether the fuel is regular gasoline or high-octane gasoline, based on whether or not a knock has occurred.

Meanwhile, with regard to the EGR ratio, there are two methods, i.e., a method (referred to as an external EGR, hereinafter) in which an EGR valve is provided in an EGR path that connects the exhaust pipe with the intake pipe of the internal combustion engine and the EGR amount is controlled based on the opening degree of the EGR valve and a method (referred to as an internal EGR) in which a variable valve timing mechanism (referred to as a VVT (Variable Valve Timing), hereinafter), which makes the opening/closing timings of an intake valve and an exhaust valve variable, is provided and depending on the opening/closing timing of the VVT, an overlap period, during which the intake valve and the exhaust valve are concurrently opened, is changed so that the amount of EGR, which is caused by remaining exhaust gas in the cylinder, is controlled; in some cases, both the methods are concurrently utilized. In the external EGR control method, the EGR ratio can approximately be calculated from the opening degree of the EGR valve, the exhaust pressure, and the inner-intake-pipe pressure.

In the following explanation, an EGR and an EGR ratio, when simply expressed in this manner, denote an external EGR and an external EGR ratio, respectively.

Because in recent years, in order to further reduce the fuel cost and further raise the output, there is commonly utilized an internal combustion engine having an external EGR and a VVT for an intake valve and an exhaust valve (hereinafter, referred to as an intake/exhaust VVT), the amount of air taken into the cylinder from the intake manifold largely changes depending on the opening degree or the valve timing of the EGR valve; therefore, unless the effect of the opening degree or the valve timing of the EGR valve is considered, the accuracy of calculating the amount of air taken into the cylinder in the whole driving region including the steady and the transient mode is largely deteriorated, especially, in a S/D method. Because when the opening degree or the valve timing of the EGR valve is changed, the response is delayed, the fact that during transient driving, the changed opening degree or the valve timing of the EGR valve does not coincide with the opening degree or the valve timing of the EGR valve, which has been set during steady driving, causes the accuracy of calculating the air flow rate to largely deteriorate.

Therefore, to date, as a method, according to the S/D method, of estimating a cylinder intake air flow rate, the method disclosed in Patent Document 1 has been proposed. Patent Document 1 discloses that the amount of air taken into a cylinder is calculated from the intake manifold pressure MAP, the volume efficiency VE, the cylinder volume V, and the temperature T; however, in Patent Document 1, it is assumed that the parameters of an internal combustion engine such as the opening degree and the valve timing of the EGR valve do not change. Provided EGR or the intake/exhaust VVT is applied to the S/D method disclosed in Patent Document 1, it is conceivable that the volume efficiency VE at a time when the opening degree of the EGR valve coincides with the control map for the opening degree of the EGR valve or at a time when the valve timing coincides with the control map for the valve timing is set as a map value; however, although posing any problem during steady driving, the foregoing method causes the accuracy of calculating the air amount to largely deteriorate during transient driving. Thus, in accordance with the opening degree or the valve timing of the EGR valve, a great number of maps for the volume efficiency VE are prepared so that the accuracy of calculating the air amount can be suppressed from deteriorating during transient driving.

In recent years, it has become common that an internal combustion engine is controlled by utilizing, as an index, the output torque of the internal combustion engine; even when the output torque is estimated, the thermal efficiency changes in accordance with the cylinder intake air flow rate and the EGR ratio. Accordingly, in order to calculate the foregoing MBT and furthermore in order to estimate the torque and the thermal efficiency, it is required to accurately calculate the cylinder intake air flow rate and the EGR ratio. In order to accurately obtain the EGR ratio, it is required to accurately calculate the EGR flow rate.

Therefore, to date, as a method of calculating an EGR flow rate and an EGR ratio, the method disclosed in Patent Document 2 has been proposed. Patent Document 2 discloses a method in which the EGR flow rate is calculated based on an exhaust gas amount obtained from the opening area of an EGR valve and an exhaust gas amount obtained from an opening area command value for the EGR valve and then the EGR ratio is estimated. With a simple configuration, the method disclosed in Patent Document 2 make it possible to calculate an EGR flow rate, by utilizing a preliminarily provided "EGR-valve opening degree vs. flow rate characteristic" and the opening area of an EGR valve.

PRIOR ART REFERENCE

Patent Document

[Patent Document 1] Japanese Patent Application Laid-Open No. H08-303293
[Patent Document 2] Japanese Patent Application Laid-Open No. H07-279774

However, in the case where the conventional method disclosed in Patent Document 1 is applied to the opening degree of an EGR valve or an intake/exhaust VVT, it is required to set a map for the volume efficiency VE in accordance with the opening degree of the EGR valve and the respective valve timings of the intake/exhaust VVT. For example, when 6 patterns each are set for the opening degree of the EGR valve, the intake VVT, and the exhaust VVT, 216 (=6×6×6) pieces of maps are required. Thus, there have been problems that because matching and data setting require a great number of man-hours, the working becomes unrealistic and that a microcomputer as the ECT (Engine Control Unit) requires a great deal of memory capacity.

The S/D method disclosed in Patent Document 1 has a problem that during transient driving and in a predetermined time thereafter, the cylinder intake air flow rate cannot accurately be estimated. Originally, the volume efficiency correction coefficient Kv denotes the relationship among the intake manifold pressure, the inside temperature of the intake manifold (hereinafter, referred to as an intake manifold temperature), and cylinder intake air flow rate; it is derived as a dimensionless number under the condition that the relationship among the cylinder intake air flow rate, the inside pressure and temperature of the intake manifold, and the inside pressure and temperature of the exhaust manifold, which is an exhaust pipe from the exhaust valve to the catalyst, is balanced. Furthermore, it is empirically known that this balance is maintained even when a driving point once changes to another point and then returns to the original point; therefore, it is conceivable that in the S/D method, this nature is utilized and the cylinder intake air flow rate is estimated based on the intake manifold pressure, the intake manifold temperature, and the volume efficiency correction coefficient Kv under the assumption that the relationship among the intake manifold pressure, the intake manifold temperature, the cylinder intake air flow rate, and the volume efficiency correction coefficient Kv is always constant.

However, when low-load driving is transiently followed by high-load driving or when the high-load driving is transiently followed by the low-load driving, the inside temperature of the exhaust manifold, in particular, largely changes (for example, 400° C. to 800° C.); it takes some time (for example, several seconds to thirty seconds) before the temperature settles. In this case, during duration from a time point when the transient change occurs to a time point when the inside temperature of the exhaust manifold settles, the balance of the relationship among the intake manifold pressure, the intake manifold temperature, and the cylinder intake air flow rate is lost; in other words, the S/D method does not make it possible to accurately calculate the cylinder intake air flow rate until the inside temperature of the exhaust manifold settles. This may be because due to the different inside temperatures of the exhaust manifold, the internal EGR amount changes. In the AFS method, unlike the S/D method, no error occurs in estimating the cylinder intake air flow rate even during the foregoing duration from a time point when the transient change occurs to a time point when the inside temperature of the exhaust manifold.

The method disclosed in Patent Document 2 has a problem that when due to change over time, the opening degree characteristic of the EGR valve changes, the preliminarily prepared flow rate characteristic and the actual flow rate characteristic differ from each other and hence the estimation accuracy is deteriorated. The opening degree vs. flow rate characteristic of an EGR valve may change depending on not only differences among products but also the condition of a mounted internal combustion engine.

SUMMARY OF THE INVENTION

The present invention has been implemented in order to solve the foregoing problems in the conventional technology; the objective thereof is to provide an internal combustion engine control apparatus including an exhaust gas recirculation amount estimation unit that can estimate an EGR flow rate with an accuracy enough to appropriately control the internal combustion engine.

An internal combustion engine control apparatus according to the present invention includes a throttle valve provided in an intake pipe of an internal combustion engine; an inner-intake-pipe pressure detection unit that detects, as an inner-intake-pipe pressure, a pressure in the intake pipe at the downstream side of the throttle valve; a volume efficiency corresponding value calculation unit that calculates a volume efficiency corresponding value as an index that indicates an amount of air that flows from the intake pipe at the downstream side of the throttle valve into a cylinder of the internal combustion engine; a cylinder intake air flow rate estimation unit that estimates a cylinder intake air flow rate utilized in controlling the internal combustion engine, based on the detected inner-intake-pipe pressure and the calculated volume efficiency corresponding value; a throttle effective opening area calculation unit that calculates a throttle effective opening area corresponding to a throttle opening degree of the throttle valve, based on the estimated cylinder intake air flow rate; a throttle opening degree learning unit that learns the relationship between the calculated throttle effective opening area and the throttle opening degree; a throttle opening degree sensor that detects a throttle opening degree of the throttle valve; a throttle flow rate estimation unit that estimates a throttle flow rate of air that passes through the throttle valve and is taken into the internal combustion engine, based on the detected throttle opening degree and the result of the throttle opening degree learning; an exhaust gas recirculation path that connects the intake pipe at the downstream side of the throttle valve with an exhaust pipe of the internal combustion engine; an exhaust gas recirculation valve that opens or closes the exhaust gas recirculation path so as to control an recirculation amount of exhaust gas in the internal combustion engine; an exhaust gas recirculation amount calculation unit that calculates an exhaust gas recirculation amount, based on the estimated cylinder intake air flow rate and the estimated throttle flow rate; an exhaust gas recirculation valve effective opening area calculation unit that calculates an exhaust gas recirculation valve effective opening area corresponding to an opening degree of the exhaust gas recirculation valve, based on the estimated exhaust gas recirculation amount; an exhaust gas recirculation valve opening degree sensor that detects an opening degree of the exhaust gas recirculation valve; and an exhaust gas recirculation amount estimation unit that learns the relationship between the detected opening degree of the exhaust gas recirculation valve and the calculated effective opening area of the exhaust gas recirculation valve and estimates an exhaust gas recirculation amount, based on the relationship between a control exhaust gas recirculation valve effective opening area calculated based on the learning and an opening degree of the exhaust gas recirculation valve. The internal combustion engine control apparatus is characterized by utilizing the exhaust gas recirculation amount estimated by the exhaust gas recirculation amount estimation unit in controlling the internal combustion engine.

An internal combustion engine control apparatus according to the present invention makes it possible that even when due to deposits such as soot and the like, the flow rate characteristic changes or even when due to a change over time, the EGR valve does not work, the EGR flow rate is accurately estimated.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 3 is a map for calculating volume efficiency correction coefficients utilized in an internal combustion engine control apparatus according to Embodiment 1 of the present invention;

FIG. 5 is a map representing a throttle opening degree vs. effective opening area characteristic utilized in an internal combustion engine control apparatus according to Embodiment 1 of the present invention;

FIG. 6 is a map, representing the relationship between the throttle opening degree and the learning value, utilized in an internal combustion engine control apparatus according to Embodiment 1 of the present invention;

FIG. 10 is a map, representing the relationship between the EGR valve opening degree and the effective opening area, utilized in an internal combustion engine control apparatus according to Embodiment 1 of the present invention;

FIG. 11 is a map, representing the relationship between the EGR valve opening degree and the learning value, utilized in an internal combustion engine control apparatus according to Embodiment 1 of the present invention;

DETAILED DESCRIPTION OF THE PREFERRED EMBODIMENTS

Embodiment 1

Figure 1:
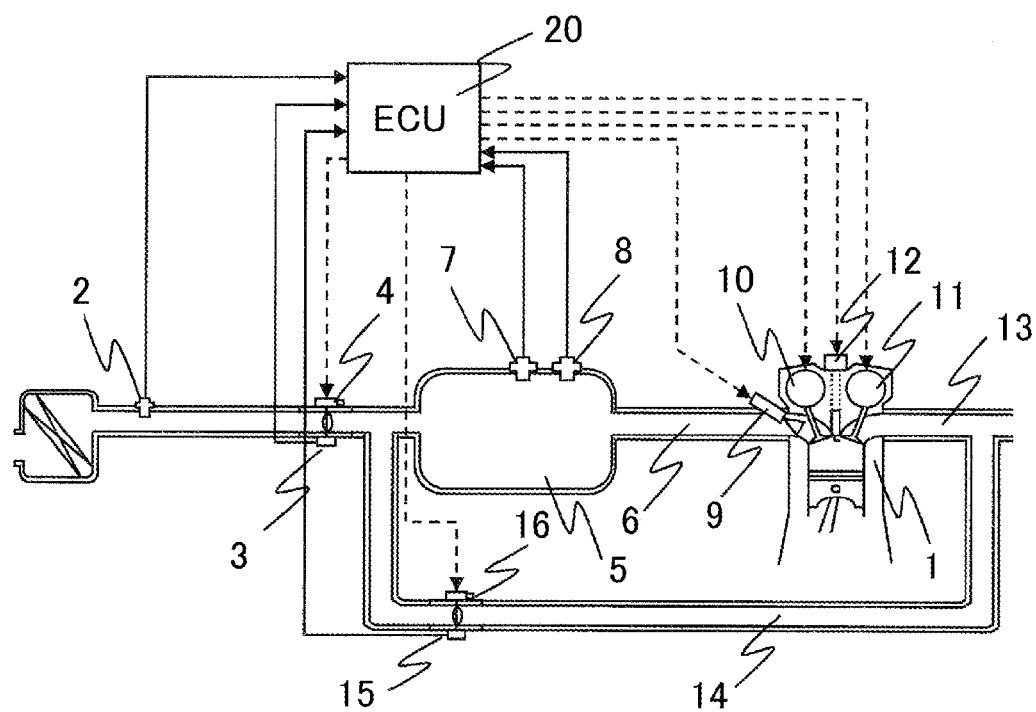
FIG. 1 is a configuration diagram schematically illustrating an internal combustion engine to which internal combustion engine control according to Embodiment 1 of the present invention is applied.

Hereinafter, an internal combustion engine control apparatus according to Embodiment 1 of the present invention will be explained in detail with reference to the drawings. FIG. 1 is a configuration diagram schematically illustrating an internal combustion engine to which internal combustion engine control according to Embodiment 1 of the present invention is applied. In FIG. 1, at the upstream side of an intake pipe included in the intake system of an internal combustion engine 1, there is provided an electronically-controlled throttle valve (hereinafter, referred to simply as a throttle) 4 that can electrically be controlled so as to adjust an intake air flow rate. In order to measure the opening degree of the throttle 4, a throttle opening degree sensor 3 is provided.

An atmospheric air temperature sensor 2 for measuring the atmospheric air temperature is provided at the upstream side of the throttle 4 in the intake pipe. Furthermore, there are provided an intake manifold pressure sensor 7, as an inner-intake-pipe pressure detection unit, that measures the pressure (hereinafter, referred to as an intake manifold) in a space (referred to as an intake manifold, hereinafter) including a surge tank 5 and an intake manifold 6 provided at the downstream side of the throttle 4 and an intake air temperature sensor 8 that measures the temperature inside the intake manifold (referred to as an intake manifold temperature, hereinafter). It may also be allowed that instead of providing the intake air temperature sensor 8 that measures an intake manifold temperature, a measurement value obtained by the atmospheric air temperature sensor 2 is utilized so that the intake manifold temperature is estimated from the atmospheric air temperature, although strictly speaking, the estimated temperature differs from the temperature measured by use of the intake air temperature sensor 8. In contrast, it may be allowed that instead of the atmospheric air temperature sensor 2, the intake air temperature sensor 8 is utilized so that the atmospheric air temperature is estimated from an intake manifold temperature.

An injector 9 for injecting a fuel is provided in the vicinity of the intake valve including the intake manifold 6 and the inside of the cylinder of the internal combustion engine; an intake VVT 10 and an exhaust VVT 11 for changing the valve timing are provided in the intake valve and the exhaust valve, respectively; an ignition coil 12 for driving an ignition plug that produces a spark in a cylinder is provided on the cylinder head. A catalyst and an $O_2$ sensor, which are unillustrated, are provided in an exhaust manifold 13. In FIG. 1, at the upstream side of an intake pipe included in the intake system of an internal combustion engine 1, there is provided an electronically-controlled throttle valve (hereinafter, referred to simply as a throttle) 4 that can electrically be controlled so as to adjust an intake air flow rate. An exhaust gas recirculation valve (referred to as an EGR valve, hereinafter) 16 for controlling an exhaust gas recirculation amount (referred to as an EGR flow rate, hereinafter) is provided in the EGR path 14; in order to measure the opening degree of the EGR valve 16, an EGR valve opening degree sensor 15 is provided therein.

Figure 2:
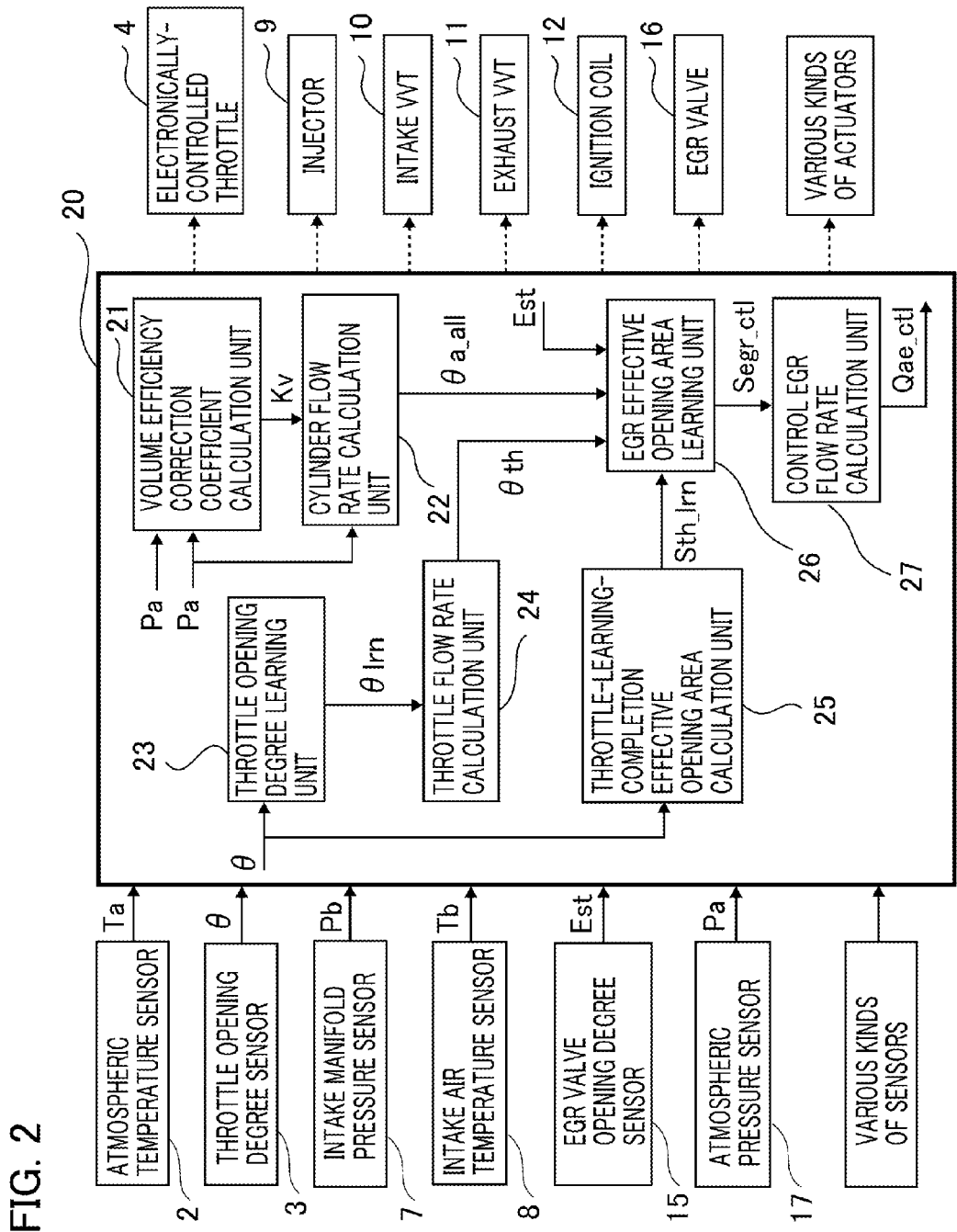
FIG. 2 is a block diagram illustrating an internal combustion engine control apparatus according to Embodiment 1 of the present invention.

FIG. 2 is a block diagram illustrating an internal combustion engine control apparatus according to Embodiment 1 of the present invention. In FIG. 2, an opening degree θ of the throttle 4 measured by the throttle opening degree sensor 3, an intake manifold pressure Pb measured by the intake manifold pressure sensor 7, an intake manifold temperature Tb measured by the intake air temperature sensor 8, an opening degree Est of the EGR valve 16 measured by the EGR valve opening degree sensor 15, and an atmospheric pressure Pa measured by an atmospheric pressure sensor 17 are inputted to an electronic control unit (referred to as an ECU, hereinafter) 20.

Instead of the atmospheric pressure sensor 17 for measuring an atmospheric pressure, either a unit for estimating the atmospheric pressure or an atmospheric pressure sensor incorporated in the ECU 20 may be utilized. Measurement values are also inputted to the ECU 20 from various sensors 18 (including an accelerator opening degree sensor and a crank angle sensor, which are unillustrated). In the ECU 20, a volume efficiency correction coefficient calculation unit 21 calculates the volume efficiency correction coefficient Kv. A cylinder flow rate calculation unit 22 calculates a cylinder flow rate Qa_all by use of the volume efficiency correction coefficient Kv, the intake manifold pressure Pb, and the intake manifold temperature Tb. A throttle opening degree learning unit 23 calculates a throttle opening degree learning value θlrn from a throttle effective opening area Sth calculated based on the calculated cylinder flow rate Qa_all and the throttle opening degree θ.

During steady driving, a throttle flow rate calculation unit 24 calculates a throttle flow rate Qth by use of the cylinder flow rate Qa_all calculated through a method that is the same as the conventional S/D method. During transient driving, the throttle flow rate calculation unit 24 calculates the throttle flow rate Qth by use of a control throttle effective opening area Sth_ctl calculated based on the throttle opening degree learning value θlrn and the throttle opening degree θ obtained during steady driving. A throttle-learning-completion effective opening area calculation unit 25 calculates a throttle-learning-completion effective opening area Sth_lrn based on the throttle effective opening area Sth.

An EGR effective opening area learning unit 26 calculates an EGR flow rate Qae by use of the cylinder flow rate Qa_all and the throttle flow rate Qth; then, the EGR effective opening area learning unit 26 calculates an EGR effective opening area Segr by use of the calculated EGR flow rate Qae and the intake manifold temperature Tb. An EGR base effective opening area Segr_bse is calculated from the EGR valve opening degree Est; then, an EGR effective opening area learning value Klrn is calculated by use of the EGR effective opening area Segr and the EGR base effective opening area Segr_bse. The EGR effective opening area learning value Klrn is stored as a learning value in accordance with the EGR valve opening degree Est; then, a control EGR effective opening area Segr_ctl is calculated based on the stored EGR effective opening area learning value Klrn and the EGR base effective opening area Segr_bse.

A control EGR flow rate calculation unit 27 calculates a control EGR flow rate Qae_ctl by use of the EGR effective opening area Segr_ctl. An EGR ratio is calculated from the control EGR flow rate Qae_ctl, the throttle flow rate Qth, and the volume efficiency correction coefficient Kv; then, based on the calculated EGR ratio, the injector 9, the ignition coil 12, and the like are driven. A desired torque is calculated based on various kinds of inputted data items such as the accelerator opening degree and the like; a desired cylinder intake air flow rate for achieving the calculated desired torque is calculated; a desired throttle opening degree, a desired intake VVT phase angle, and a desired exhaust VVT phase angle are calculated so that the desired cylinder intake air flow rate is achieved; based on these desired values, the opening degree of the electronically-controlled throttle 4 and the respective phase angles of the intake VVT 10 and the exhaust VVT 11 are controlled. Furthermore, other various kinds of actuators are also controlled, as may be necessary.

Next, the volume efficiency correction coefficient calculation unit 21 in FIG. 2 will be explained in detail. FIG. 3 is a map for calculating volume efficiency correction coefficients utilized in an internal combustion engine control apparatus according to Embodiment 1 of the present invention. The volume efficiency correction coefficient calculation unit 21 performs the calculation, based on the rotation speed Ne of the internal combustion engine and the ratio of the intake manifold pressure Pb to the atmospheric pressure Pa, obtained, for example, from the map represented in FIG. 3. When the internal combustion engine rotation speed Ne is 3000[r/min] and the ratio of the intake manifold pressure Pb to the atmospheric pressure Pa is 0.6, Kv is 0.9. Because the volume efficiency correction coefficient Kv changes depending on the valve timing, a map corresponding to the change in the variable valve timing is required. When each of the changing ranges of the intake valve and the exhaust valve is from 0 degCA to 50 degCA and a map is prepared every 10 degCA, 36 (6×6) maps are required. In general, there are prepared two maps, i.e., a map corresponding to the desired valve timing depending on the driving condition and a map at a time when the variable valve timing is not being operated. It goes without saying that Kv may be obtained not through a map but through calculation.

Next, the cylinder flow rate calculation unit 22 in FIG. 2 will be explained in detail. The cylinder flow rate Qa_all is calculated based on the volume efficiency correction coefficient Kv and the intake manifold pressure Pb.

$$Qa\_all = \frac{Pb \cdot Vc \cdot Kv}{T(n) \cdot R \cdot (Tb + 273)} \quad (1)$$

where Qa_all, Vc, T(n), and R are the cylinder flow rate [g/s], the cylinder volume [L], the every-180° crank angle period [s], and the gas constant [kJ/(kg·K)], respectively. The cylinder flow rate Qa_all and the volume efficiency correction coefficient Kv are given by the equation (1); therefore, when the volume efficiency correction coefficient Kv has been calculated, the cylinder flow rate Qa_all is calculated.

Next, the processing performed, in the ECU 20 in FIG. 2, by the throttle opening degree learning unit 23, the throttle flow rate calculation unit 24, the throttle-learning-completion effective opening area calculation unit 25, the EGR effective opening area learning unit 26, and the control EGR flow rate calculation unit 27 will be explained in detail with reference to a flowchart to be implemented through an interrupt processing (e.g., an every-BTDC75degCA interrupt processing), which is performed every predetermined crank angle.

Figure 4:
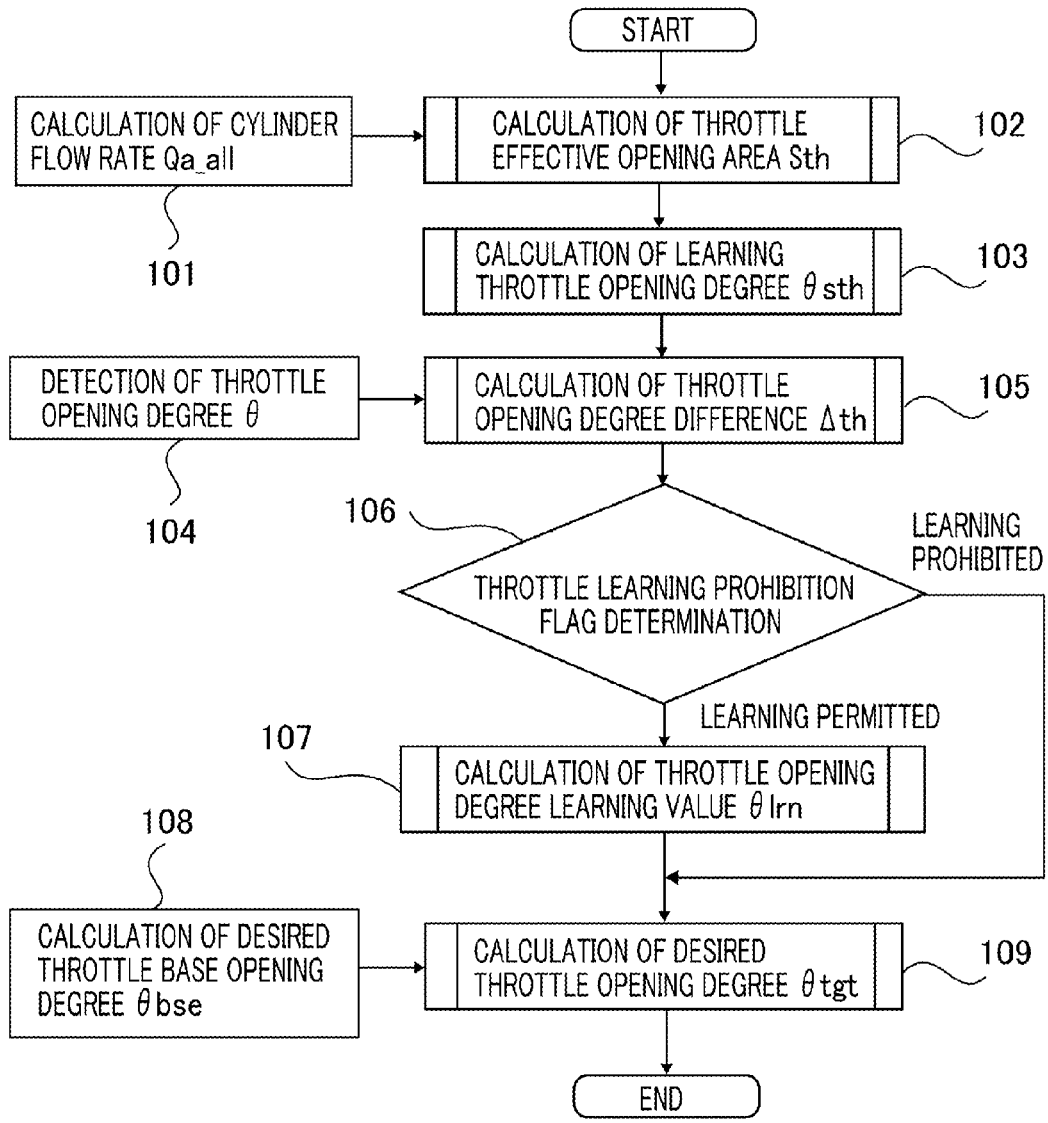
FIG. 4 is a flowchart representing the procedure for implementing throttle opening degree learning in an internal combustion engine control apparatus according to Embodiment 1 of the present invention.

FIG. 4 is a flowchart representing the procedure for implementing throttle opening degree learning in an internal combustion engine control apparatus according to Embodiment 1 of the present invention. The steps 101 through 109 in the flowchart represented in FIG. 4 are implemented by the throttle opening degree learning unit 23 in FIG. 2. In FIG. 4, the cylinder flow rate Qa_all is calculated in the step 101; in the step 102, based on the cylinder flow rate Qa_all obtained in the step 101, the throttle effective opening area Sth is calculated through the equation (2) below.

$$Sth = \frac{Qa\_all}{\alpha_a \cdot \sigma_a \cdot \rho_a} \quad (2)$$

where Sth, Qa_all, $\alpha_a$, $\sigma_a$, and $\rho_a$ are the throttle effective opening area [mm$^2$], the cylinder flow rate [g/s], the inner-intake-pipe (atmospheric) sonic velocity [m/s], the dimensionless flow rate [g/s], and the inner-intake-pipe (atmospheric) density, respectively.

Because the relationship between the throttle effective opening area Sth and the cylinder flow rate Qa_all, given by the foregoing equation (2), is established, the throttle effective opening area Sth is obtained when the respective constants are obtained. The constants $\alpha_a$, $\sigma_a$, and $\rho_a$ are defined by the equations (3), (4), and (5) below.

$$\alpha_a = \sqrt{\kappa \cdot R \cdot Tb} \quad (3)$$

where $\kappa$, R, and Tb are the specific heat ratio (1.4, when the gas is air), the gas constant [kJ/(kg·K)], and the inner-intake-pipe temperature (=the intake air temperature=the atmospheric air temperature), respectively.

Because the inner-intake-pipe sonic velocity $\alpha_a$ is a function of the intake air temperature, it may be allowed that the calculation through the equation (3) is not performed in the ECU and as a map regarding the temperature, results of preliminarily performed calculation are prepared. Because being the constant corresponding to a gas, the gas constant R is preliminarily defined. Because air is a gas inside the intake pipe, the gas constant of air may be set or the gas constant may be varied as an estimated value.

$$\sigma_a = \sqrt{\frac{2}{\kappa-1}\left[\left(\frac{Pb}{Pa}\right)^{\frac{2}{\kappa}} - \left(\frac{Pb}{Pa}\right)^{\frac{\kappa+1}{\kappa}}\right]} \quad (4)$$

where $\kappa$, Pb, and Pa are the specific heat ratio (1.4, when the gas is air), the intake manifold pressure [kPa], and the atmospheric pressure [kPa], respectively. Because the dimensionless flow rate $\sigma_a$ is a function of the ratio of the intake manifold pressure Pb to the atmospheric pressure Pa, it may be allowed that the calculation through the equation (4) is not performed in the ECU and as a map regarding the ratio of the intake manifold pressure Pb to the atmospheric pressure Pa, results of preliminarily performed calculation are prepared.

$$\rho_a = \frac{Pa}{R \cdot Tb} \quad (5)$$

where Pa, R, and Tb are the atmospheric pressure (kPa), the gas constant [kJ/(kg·K)], and the inner-intake-pipe temperature (=the intake air temperature=the atmospheric air temperature), respectively.

In the step 103, a learning throttle opening degree $\theta$sth is calculated based on the throttle effective opening area Sth obtained in the step 102. For example, as a map represented in FIG. 5, a throttle opening degree vs. effective opening area characteristic is preliminarily prepared. In other words, FIG. 5 is a map representing a throttle opening degree vs. effective opening area characteristic utilized in an internal combustion engine control apparatus according to Embodiment 1 of the present invention. Because as represented in the equation (2), the effective opening area is in proportion to the flow rate, a throttle opening degree vs. flow rate characteristic may be utilized. The learning throttle opening degree $\theta$sth corresponding to the throttle effective opening area Sth is calculated.

In the step 105, the throttle opening degree difference $\Delta$th is calculated based on the learning throttle opening degree $\theta$sth obtained in the step 103 and the throttle opening degree $\theta$ obtained in the step 104. The difference between the learning throttle opening degree $\theta$sth and the throttle opening degree $\theta$ is calculated. This difference is the throttle opening degree difference $\Delta$th.

In the step 106, it is determined whether or not throttle learning is prohibited. In the case where the throttle learning is permitted, the step 106 is followed by the step 107; in the case where the throttle learning is prohibited, the step 106 is followed by the step 109. In the conventional S/D method, the condition under which the throttle learning is prohibited is, for example, that the environmental condition such as the water temperature is inappropriate, that the present time point is in the steady driving region or at a point when a predetermined time has elapsed after a transient driving, that the cylinder flow rate is changing, that there exists a difference between the desired value of the VVT valve and the control value thereof, or the like, and when the prohibition condition is established, the throttle learning prohibition flag is set; however, because the result of the throttle learning is utilized in the EGR valve opening degree learning, the throttle learning is permitted only when the learning prohibition condition is established and the EGR operation stops (e.g., when the EGR valve opening degree is "0") during steady driving.

In the step 107, only in the case where it is determined in the step 106 that the learning is permitted, the throttle opening degree learning value $\theta$lrn is calculated based on the throttle opening degree difference $\Delta$th obtained in the step 105 and is updated. The throttle opening degree learning value $\theta$lrn may not be the throttle opening degree difference $\Delta$th but may be the ratio or the like, as long as the difference between the learning throttle opening degree $\theta$sth and the throttle opening degree $\theta$ can be seen. The throttle opening degree learning value $\theta$lrn is stored in a learning region corresponding to the throttle effective opening area Sth. The throttle opening degree learning value $\theta$lrn may be utilized as it is; alternatively, it may be multiplied by a predetermined gain or a predetermined gain may be added to it. The contents of the learning region are, for example, those in the map represented in FIG. 6. FIG. 6 is a map, representing the relationship between the throttle opening degree and the learning value, utilized in an internal combustion engine control apparatus according to Embodiment 1 of the present invention.

Storing the throttle opening degree learning value θlrn in a learning region corresponding to the throttle effective opening area Sth makes it possible to learn the throttle opening degree in detail; thus, even when the learning is prohibited, the throttle opening degree θ can accurately be calculated. The calculated value may directly be utilized without being stored in the learning region, although the accuracy is deteriorated.

In the step 109, the desired throttle opening degree θtgt is calculated based on the throttle opening degree learning value θlrn, obtained in the step 107 and stored, and a desired throttle base opening degree θbse obtained in the step 108. In the case where as a difference, the throttle opening degree learning value θlrn is stored, the throttle opening degree learning value θlrn is added to the desired throttle base opening degree θbse, so that the desired throttle opening degree θtgt can be calculated.

Figure 7:
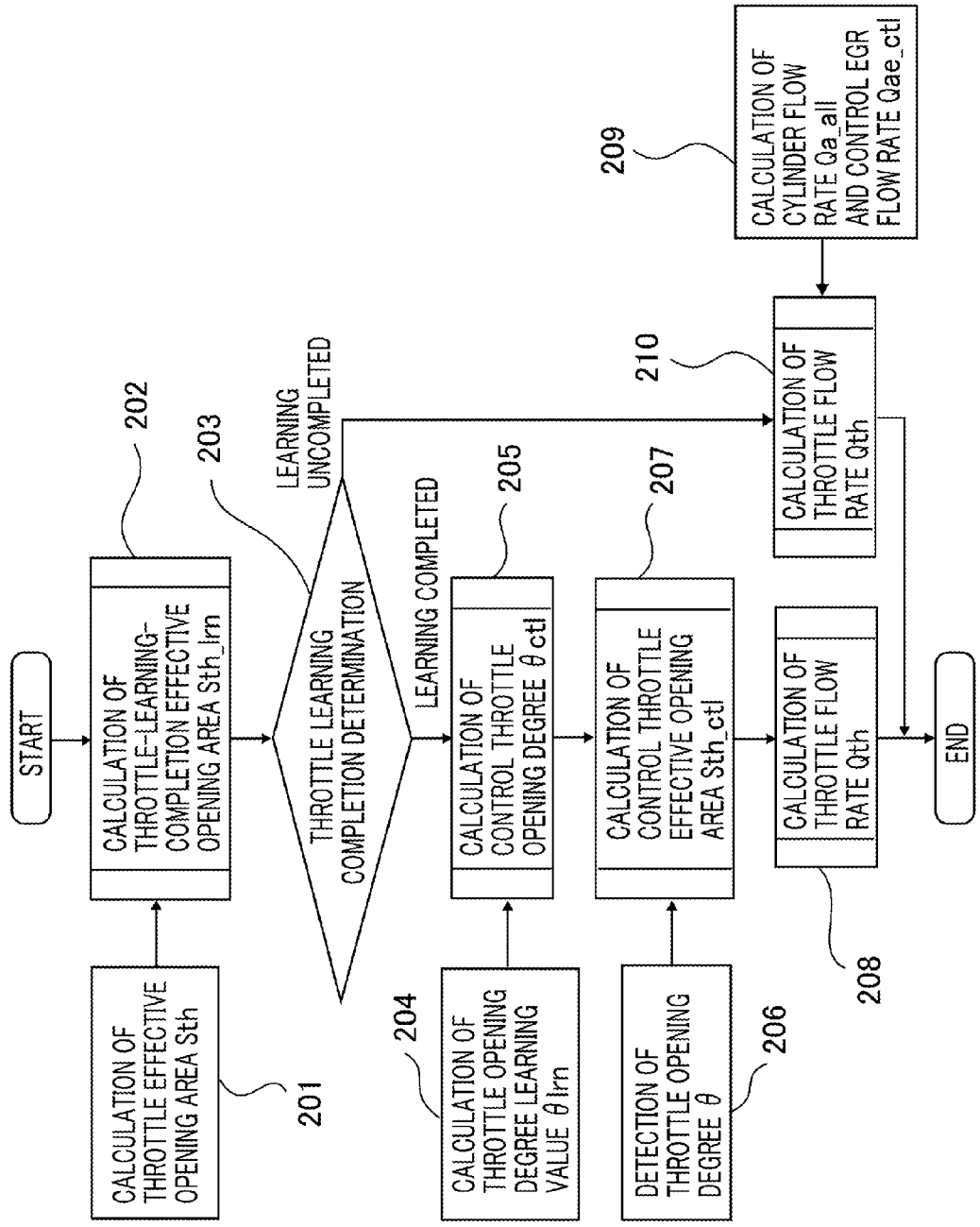
FIG. 7 is a flowchart representing the procedure for calculating a throttle flow rate in an internal combustion engine control apparatus according to Embodiment 1 of the present invention.

FIG. 7 is a flowchart representing the procedure for calculating a throttle flow rate in an internal combustion engine control apparatus according to Embodiment 1 of the present invention. The steps 201 through 210 in the flowchart represented in FIG. 7 are implemented by the throttle flow rate calculation unit 24 in FIG. 2. In the step 202 represented in FIG. 7, the throttle-learning-completion effective opening area Sth_lrn is calculated based on the throttle effective opening area Sth obtained in the step 201. The throttle-learning-completion effective opening area Sth_lrn is calculated from the maximal value of the throttle effective opening area Sth at a time when throttle opening degree learning has been performed at least once. The details of the throttle-learning-completion effective opening area Sth_lrn will be described later.

In the step 203, it is determined whether or not throttle learning has been completed. In the case where the throttle learning has been completed, the step 203 is followed by the step 205; in the case where the throttle learning has not been completed, the step 203 is followed by the step 210. The determination on whether or not throttle learning has been completed is performed, for example, by determining whether or not the desired throttle effective opening area, which is a reference value of the desired throttle opening degree θtgt, is smaller than throttle-learning-completion effective opening area Sth_lrn, which is the maximal value of the throttle effective opening area Sth at a time when throttle opening degree learning has been performed at least once. In other words, when the throttle opening degree is controlled in a region smaller than the effective opening area at a time when the throttle learning has been implemented at least once, it is determined that the throttle learning has been completed.

In the step 205, a control throttle opening degree θctl is calculated based on the throttle opening degree learning value θlrn obtained in the step 204. The throttle opening degree learning value θlrn is added to the throttle opening degree in the throttle opening degree vs. effective opening area characteristic, so that the control throttle opening degree θctl can be calculated and hence the control throttle opening degree θctl vs. throttle effective opening area Sth characteristic can be obtained.

In the step 207, the control throttle effective opening area Sth_ctl is calculated based on the throttle opening degree θ obtained in the step 206. The control throttle effective opening area Sth_ctl can be calculated from the throttle opening degree θ in the control throttle opening degree θctl vs. throttle effective opening area Sth characteristic. In the step 208, the throttle flow rate Qth is calculated through the equation (6) below, based on the control throttle effective opening area Sth_ctl obtained in the step 207.

$$Qth = \frac{Sth\_ctl}{\alpha_a \cdot \sigma_a \cdot \rho_a} \quad (6)$$

where Qth, Sth_ctl, $\alpha_a$, $\sigma_a$, and $\rho_a$ are the throttle flow rate [g/s], the control throttle effective opening area [mm$^2$], the inner-intake-pipe (atmospheric) sonic velocity [m/s], the dimensionless flow rate [g/s], and the inner-intake-pipe (atmospheric) density, respectively. Because the relationship between the throttle flow rate Qth and the control throttle effective opening area Sth_ctl, given by the equation (6), is established, the throttle flow rate Qth is obtained when the respective constants are obtained. The constants $\alpha_a$, $\sigma_a$, and $\rho_a$ are obtained through the foregoing equations (3), (4), and (5).

In the step 210, the throttle flow rate Qth is calculated based on the cylinder flow rate Qa_all obtained in the step 209 and the after-mentioned control EGR flow rate Qae_ctl. The throttle flow rate Qth can be calculated from the difference between the cylinder flow rate Qa_all and the control EGR flow rate Qae_ctl.

Figure 8:
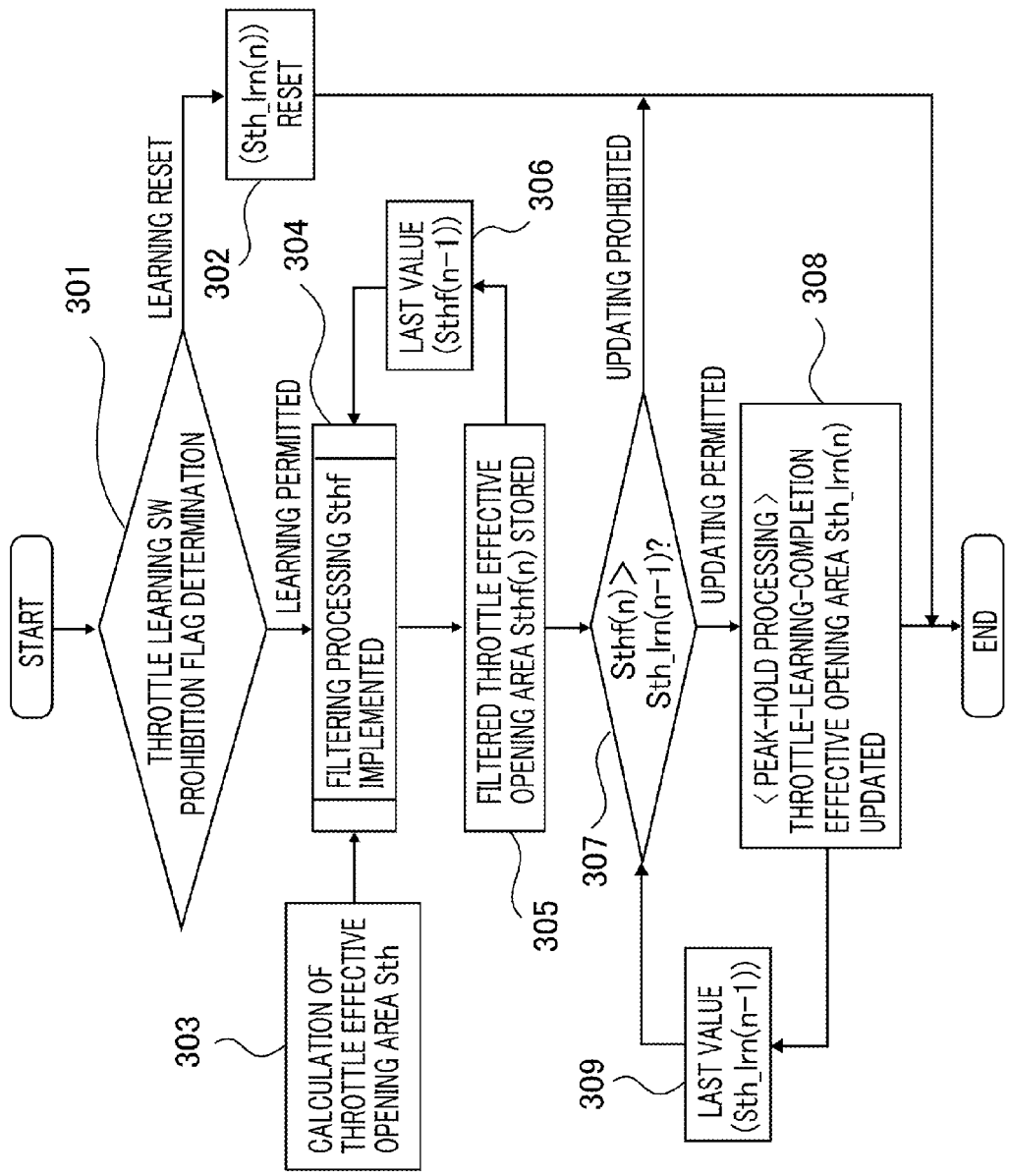
FIG. 8 is a flowchart representing the procedure for calculating a throttle-learning-completion effective opening area in an internal combustion engine control apparatus according to Embodiment 1 of the present invention.

Next, the calculation of the throttle-learning-completion effective opening area Sth_lrn, which is performed in the step 202 in FIG. 7, will be explained in detail with reference to a flowchart represented in FIG. 8. This processing is performed in interrupt processing (for example, BTDC75degCA interrupt processing) in the cycle of a predetermined crank angle. FIG. 8 is a flowchart representing the procedure for calculating a throttle-learning-completion effective opening area in an internal combustion engine control apparatus according to Embodiment 1 of the present invention. The steps 301 through 309 in the flowchart represented in FIG. 8 are implemented by the throttle-learning-completion effective opening area calculation unit 25 in FIG. 2.

In the step 301 in the flowchart represented in FIG. 8, it is determined whether or not throttle learning SW is prohibited. In the case where the throttle learning is permitted, the step 301 is followed by the step 304; in the case where the throttle learning is to be reset, the step 301 is followed by the step 302. For example, when a failure determination for the intake manifold pressure suggests that the learned value itself is not reliable, a throttle learning SW prohibition flag is set and it is determined that the learning is to be reset. In the step 302, because of the determination of learning reset, the after-mentioned throttle-learning-completion effective opening area Sth_lrn is reset (=0).

In the step 304, filtering processing according to the equation (7) below is applied to the throttle effective opening area Sth obtained in the step 303.

$$Sthf(n) = K_1 \cdot Sthf(n-1) + (1 - K_1) \cdot Sth(n) \quad (7)$$

where Sthf(n), Sth(n), Sthf(n−1), and K1 are the filtered throttle effective opening area [mm$^2$], the present throttle effective opening area [mm$^2$], the immediately previous filtered throttle effective opening area [mm$^2$], and the filter constant (for example, a value approximately between 0.9 and 0.99 is utilized), respectively.

In order to implement the equation (7), the immediately previous filtered throttle effective opening area Sthf(n−1) is required. Accordingly, in the step 305, the filtered throttle effective opening area Sthf(n), which is the result of the filtering processing, is stored so that it can be utilized as Sthf(n−1). Because being stored in the step 305, which is the immediately previous process, the filtered throttle effective opening area Sthf(n) can be utilized as the immediately previous filtered throttle effective opening area Sthf(n−1) in the present process of the step 306.

Then, in the step 307, it is determined whether or not the filtered throttle effective opening area Sthf(n) is larger than its previous value. In the step 308, as peak hold processing, the filtered throttle effective opening area Sthf(n) is stored in the throttle-learning-completion effective opening area Sth_lrn (n), based on the result of the determination in the step 307. In other words, in the case where Sthf(n)>Sth_lrn(n), updating is permitted and then the filtered throttle effective opening area Sthf(n) is stored in the throttle-learning-completion effective opening area Sth_lrn(n); in any other cases, the updating is prohibited and then holding processing is applied to Sth_lrn(n) (Sth_lrn(n)=Sth_lrn(n−1)). The throttle-learning-completion effective opening area Sth_lrn(n) is stored so that it can be utilized as Sth_lrn(n−1).

Because being stored in the step 308, which is the immediately previous process, the throttle-learning-completion effective opening area Sth_lrn(n) can be utilized as the immediately previous throttle-learning-completion effective opening area Sth_lrn(n−1) in the present process of the step 309.

Figure 9:
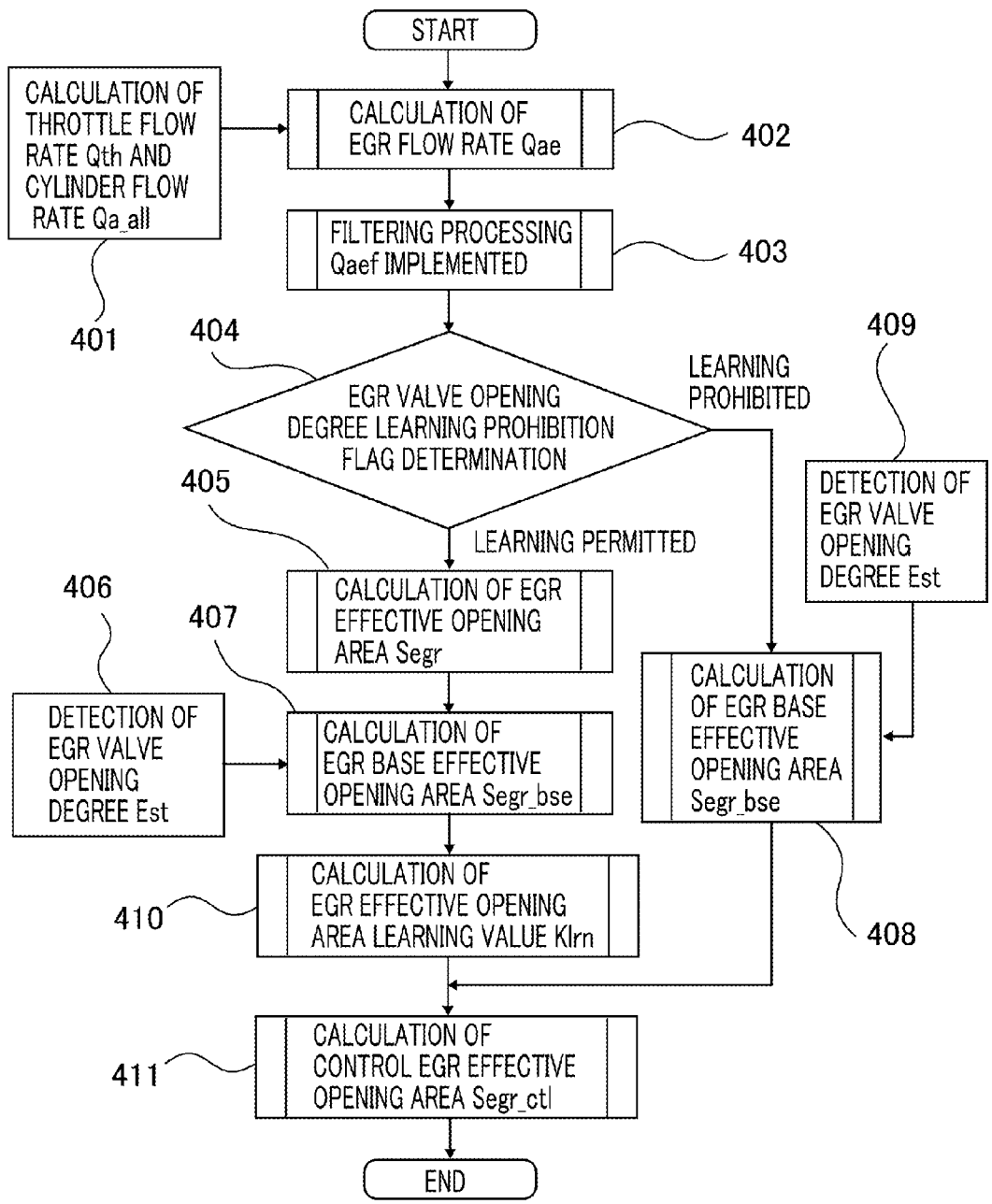
FIG. 9 is a flowchart representing the procedure for implementing EGR effective opening area learning in an internal combustion engine control apparatus according to Embodiment 1 of the present invention.

FIG. 9 is a flowchart representing the procedure for implementing EGR effective opening area learning in an internal combustion engine control apparatus according to Embodiment 1 of the present invention. The steps 401 through 411 in the flowchart represented in FIG. 9 are implemented by the EGR effective opening area learning unit 26 in FIG. 2. In the step 402 of the flowchart in FIG. 9, the EGR flow rate Qae is calculated. The difference between the cylinder flow rate Qa_all and the throttle flow rate Qth, obtained in the step 401, is the EGR flow rate Qae.

In the step 403, filtering processing (for example, first-order-lag filter processing) is applied to the calculated EGR flow rate Qae. In many cases, minute measurement noise intrudes in the output value of a sensor utilized in the calculation through the equation (1); thus, in the case where the EGR flow rate Qae is calculated by use of the cylinder flow rate Qa_all obtained through the equation (1), an error may occur. Noise components can be attenuated by carrying out the filtering processing. The EGR flow rate Qae, the measurement noise components in which have been reduced, is utilized, so that the effect of a minute detection error included in a sensor can be eliminated; thus, the calculations thereafter can be implemented. The details of the filtering processing will be described later.

In the step 404, it is determined whether or not EGR valve opening degree learning is prohibited. In the case where the learning is permitted, the step 404 is followed by the step 405; in the case where the learning is prohibited, the step 404 is followed by the step 408. The condition under which the EGR valve opening degree learning is prohibited is, for example, that the environmental condition such as the water temperature is inappropriate, that the present time point is in the steady driving region or at a point when a predetermined time has elapsed after a transient driving, that the EGR valve opening degree is changing, that there exists a difference between the desired value of the VVT valve and the control value thereof, or the like, and when the prohibition condition is established, the EGR valve opening degree learning prohibition flag is set; however, because the throttle flow rate Qth is utilized for raising the accuracy of the EGR valve opening degree learning during transient driving, the learning is permitted only when the learning prohibition condition and a throttle-learning-completion determination condition (the step 203 in FIG. 7) are established.

In the step 405, the EGR effective opening area Segr is calculated through the equation (8) below, based on the EGR flow rate Qae.

$$Segr = \frac{Qae}{\alpha_e \cdot \sigma_e \cdot \rho_e} \quad (8)$$

where Segr, Qae, $\alpha_e$, $\sigma_e$, and $\rho_e$ are the EGR effective opening area [mm$^2$], the EGR flow rate [g/s], the inner-exhaust-pipe sonic velocity [m/s], the dimensionless flow rate, and the inner-exhaust-pipe density, respectively. Because the relationship between the EGR effective opening area Segr and the EGR flow rate Qae, given by the foregoing equation (8), is established, the EGR effective opening area Segr is obtained when the respective constants are obtained. The constants $\alpha_e$, $\sigma_e$, and $\rho_e$ are defined by the equations (9), (10), and (11) below.

$$\alpha_e = \sqrt{\kappa \cdot R \cdot Tex} \quad (9)$$

where $\kappa$, R, and Tex are the specific heat ratio (1.4, when the gas is air), the gas constant [kJ/(kg·K)], and the inner-exhaust-pipe temperature, respectively.

The inner-exhaust-pipe temperature Tex may be measured by a temperature sensor provided in the exhaust pipe or may be calculated, for example, from a map including the internal combustion engine rotation speed Ne and an internal combustion engine filling efficiency Ec (calculated from the intake air amount). Because the inner-exhaust-pipe sonic velocity $\alpha_e$ is a function of the exhaust gas temperature, it may be allowed that the calculation through the equation (9) is not performed in the ECU and as a map regarding the temperature, results of preliminarily performed calculation are prepared. Because being the constant corresponding to a gas, the gas constant R is preliminarily defined. The composition of the gas in the exhaust pipe changes depending on the combustion condition; however, for the sake of simplicity, the gas constant of air may be set; alternatively, it may be allowed that the combustion condition is estimated and the gas constant R is considered to be variable.

$$\sigma_e = \sqrt{\frac{2}{\kappa - 1}\left[\left(\frac{Pb}{Pex}\right)^{\frac{2}{\kappa}} - \left(\frac{Pb}{Pex}\right)^{\frac{\kappa+1}{\kappa}}\right]} \quad (10)$$

where $\kappa$, Pb, and Pex are the specific heat ratio (1.4, when the gas is air), the intake manifold pressure [kPa], and the inner-exhaust-pipe pressure [kPa], respectively. The inner-exhaust-pipe temperature Tex may be measured by a pressure sensor provided in the exhaust pipe or may be calculated, for example, from a map including the internal combustion engine rotation speed Ne and an internal combustion engine filling efficiency Ec (calculated from the intake air amount). Because the dimensionless flow rate $\sigma_e$ is a function of the ratio of the intake manifold pressure Pb to the inner-exhaust-pipe pressure Pex, it may be allowed that the calculation through the equation (10) is not performed in the ECU and as a map regarding the ratio of the intake manifold pressure Pb to the inner-exhaust-pipe pressure Pex, results of preliminarily performed calculation are prepared.

$$\rho_e = \frac{Pex}{R \cdot Tex} \tag{11}$$

where Pex, R, and Tex are the inner-exhaust-pipe pressure [kPa], the gas constant [kJ/(kg·K)], and the inner-exhaust-pipe temperature, respectively. Pex and Tex are obtained through the equations (9) and (10).

In the step 407, the EGR base effective opening area Segr_bse is calculated based on the EGR valve opening degree Est obtained in the step 406. For example, a map, as represented in FIG. 10, regarding an EGR valve opening degree vs. effective opening area characteristic is preliminarily prepared. That is to say, FIG. 10 is a map, representing the relationship between the EGR valve opening degree and the effective opening area, utilized in an internal combustion engine control apparatus according to Embodiment 1 of the present invention. Because as represented in the equation (8), the effective opening area is in proportion to the flow rate, an EGR valve opening degree Est vs. flow rate characteristic may be utilized. The EGR base effective opening area Segr_bse corresponding to the EGR valve opening degree Est is calculated from such a map.

In the step 410, the EGR effective opening area learning value Klrn is calculated based on the EGR base effective opening area Segr_bse and the EGR effective opening area Segr. In other words, the difference between the EGR base effective opening area Segr_bse and the EGR effective opening area Segr is calculated. This difference is the EGR effective opening area learning value Klrn. Instead of the difference between the EGR base effective opening area Segr_bse and the EGR effective opening area Segr, another value such as the ratio or the like may be utilized as long as the foregoing difference can be seen.

The EGR effective opening area learning value Klrn is stored in a learning region corresponding to the EGR valve opening degree Est. The EGR effective opening area learning value Klrn may be utilized as it is; alternatively, it may be multiplied by a predetermined gain or a predetermined gain may be added to it. The contents of the learning region are, for example, those of a map represented in FIG. 11. That is to say, FIG. 11 is a map, representing the relationship between the EGR valve opening degree and the learning value, utilized in an internal combustion engine control apparatus according to Embodiment 1 of the present invention. Storing the EGR effective opening area learning value Klrn in a learning region corresponding to the EGR valve opening degree Est makes it possible to perform the learning in detail; thus, even when the learning is prohibited, the EGR flow rate can accurately be calculated. The calculated value may directly be utilized without being stored in the learning region, although the accuracy is deteriorated.

In the step 408, as is the case with the step 407, the EGR base effective opening area Segr_bse is calculated based on the EGR valve opening degree Est obtained in the step 409; then, the step 408 is followed by the step 411. In the step 411, the control EGR effective opening area Segr_ctl to be utilized in performing the control is calculated based on the stored EGR effective opening area learning value Klrn and the EGR base effective opening area Segr_bse. In the case where as a difference, the EGR effective opening area learning value Klrn has been stored, it is added to the EGR base effective opening area Segr_bse, so that the control EGR effective opening area Segr_ctl can be calculated.

Figure 12:
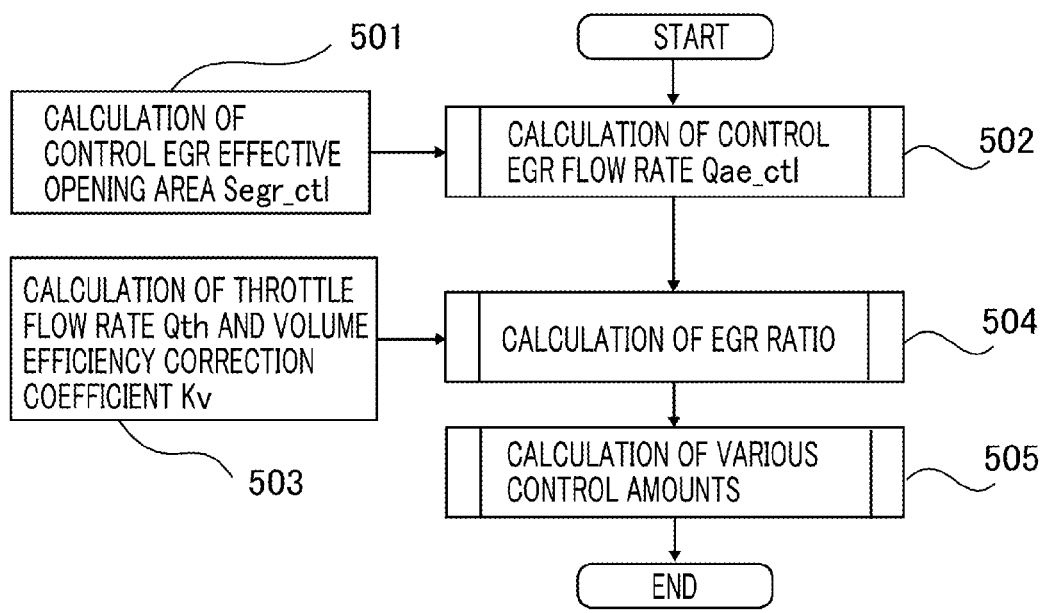
FIG. 12 is a flowchart representing the procedure for calculating an EGR flow rate in an internal combustion engine control apparatus according to Embodiment 1 of the present invention.

FIG. 12 is a flowchart representing the procedure for calculating an EGR flow rate in an internal combustion engine control apparatus according to Embodiment 1 of the present invention. The steps 501 through 505 in the flowchart represented in FIG. 12 are implemented by the EGR flow rate calculation unit 27 in FIG. 2. In the step 502 of the flowchart in FIG. 12, the control EGR flow rate Qae_ctl is calculated from the control EGR effective opening area Segr_ctl obtained in the step 501. A relationship similar to the equation (8) is established between the control ERG valve opening area Segr_ctl and the control EGR flow rate Qae_ctl; thus, the control EGR flow rate Qae_ctl is obtained.

In the step 504, the EGR ratio is calculated from the control EGR flow rate Qae_ctl, the throttle flow rate Qth obtained in the step 503, and the volume efficiency correction coefficient Kv; then, in the step 505, respective control amounts for the injector, the ignition coil, and the like are calculated and then the processing is ended.

As described above, the EGR effective opening area is learned, so that the change over the years of the EGR valve can be dealt with; therefore, the EGR flow rate utilized in performing the control can accurately be estimated and hence it is not required to utilize the difference between the cylinder flow rate and the throttle flow rate, which is likely to change.

Figure 13:
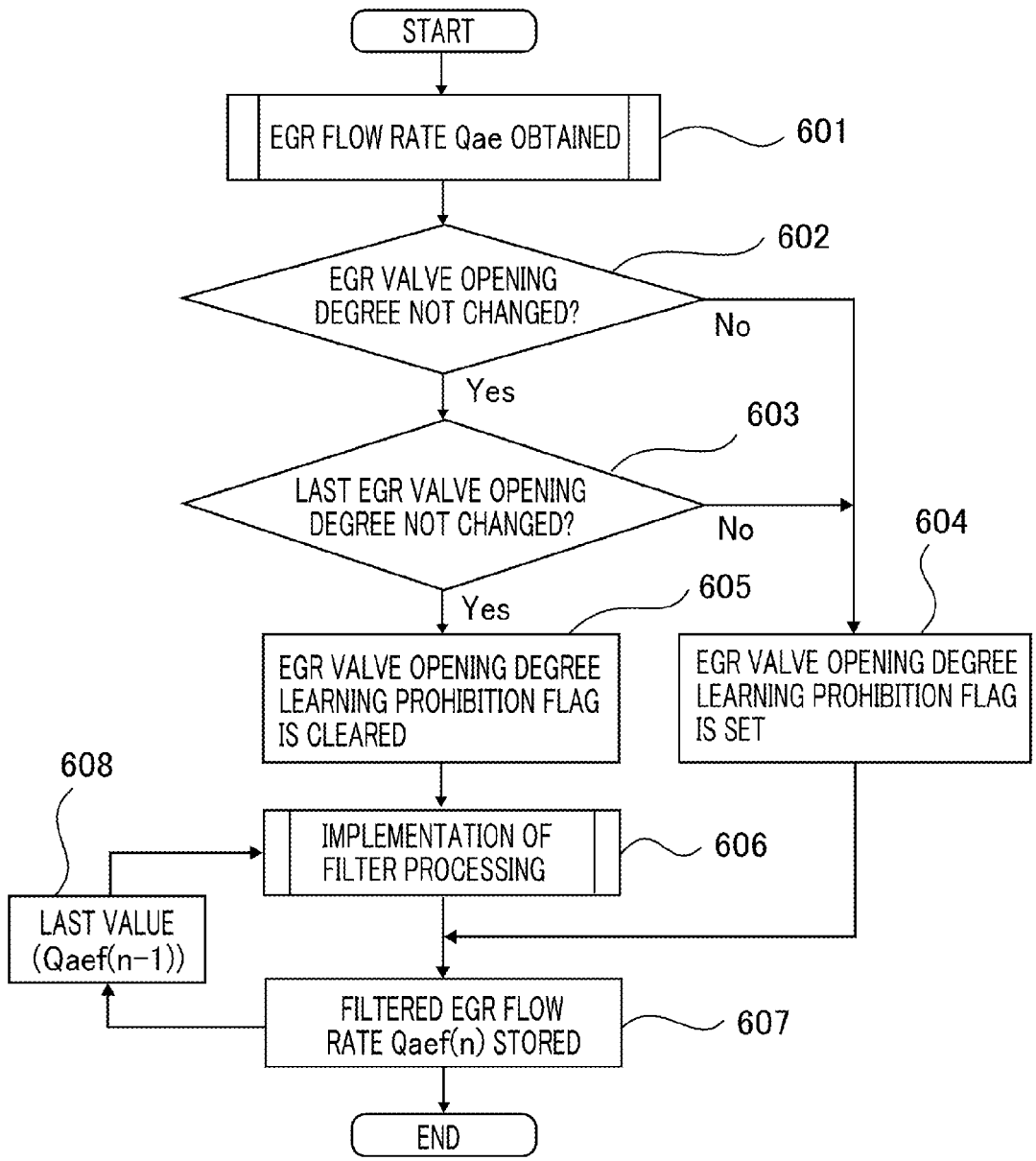
FIG. 13 is a flowchart representing the procedure for applying filtering processing to an EGR flow rate in an internal combustion engine control apparatus according to Embodiment 1 of the present invention.

Next, the filtering processing performed in the step 403 in FIG. 9, i.e., the processing performed by the EGR effective opening area learning unit 26 in the ECU 20 will be explained in detail with reference to a flowchart. FIG. 13 is a flowchart representing the procedure for applying filtering processing to an EGR flow rate in an internal combustion engine control apparatus according to Embodiment 1 of the present invention. This processing is performed in interrupt processing (for example, BTDC75degCA interrupt processing) in the cycle of a predetermined crank angle.

In the step 601 of the flowchart in FIG. 13, the EGR flow rate Qae is obtained. Subsequently, in the step 602, it is determined whether or not the EGR valve opening degree has not changed by the same as or more than a predetermined value from the immediately previous value. In the case where it is determined that the EGR valve opening degree has not changed by the same as or more than a predetermined value from the immediately previous value, the step 602 is followed by the step 603; in the case where it is determined that the EGR valve opening degree has changed by the same as or more than a predetermined value from the immediately previous value, the step 602 is followed by the step 604. In the step 603, it is determined whether or not the immediately previous EGR valve opening degree has not changed by the same as or more than a predetermined value from the twice previous value. In the case where it is determined that the immediately previous EGR valve opening degree has not changed by the same as or more than a predetermined value from the twice previous value, the step 603 is followed by the step 605; in the case where it is determined that the immediately previous EGR valve opening degree has changed by the same as or more than a predetermined value from the twice previous value, the step 603 is followed by the step 604. In the step 604, an EGR valve opening degree learning prohibition flag is set; then, the step 604 is followed by the step 607. In the step 605, the EGR valve opening degree learning prohibition flag is cleared; then, the step 605 is followed by the step 606.

In the step 606, filtering processing according to the equation (12) below is applied to the EGR flow rate Qae.

$$Qaef(n) = K_1 \cdot Qaef(n-1) + (1 - K_1) \cdot Qae(n) \tag{12}$$

where Qaef(n), Qae(n), Qae(n−1), and K1 are the filtered EGR flow rate [g/s], the present EGR flow rate [g/s], the immediately previous EGR flow rate [g/s], and the filter constant (for example, a value approximately between 0.9 and 0.99 is utilized), respectively.

In order to implement the equation (12), the immediately previous filtered EGR flow rate Qaef(n−1) is required. Accordingly, in the step 607, the filtered EGR flow rate Qaef(n), which is the result of the filtering processing, is stored so that it can be utilized as Qaef(n−1). In the case where it is determined that the EGR valve opening degree has changed, i.e., in the case where the EGR valve opening degree learning prohibition flag has been set in the flowchart represented in FIG. 13, the EGR flow rate Qae(n), to which the filtering processing has not been applied, is stored as it is.

Because being stored in the step 607, which is the immediately previous process, the filtered EGR flow rate Qaef(n) can be utilized as the immediately previous filtered EGR flow rate Qaef(n−1) in the present process of the step 608. The foregoing filtering processing can eliminate the effect of a sensor's minute detection error.

Figure 14:
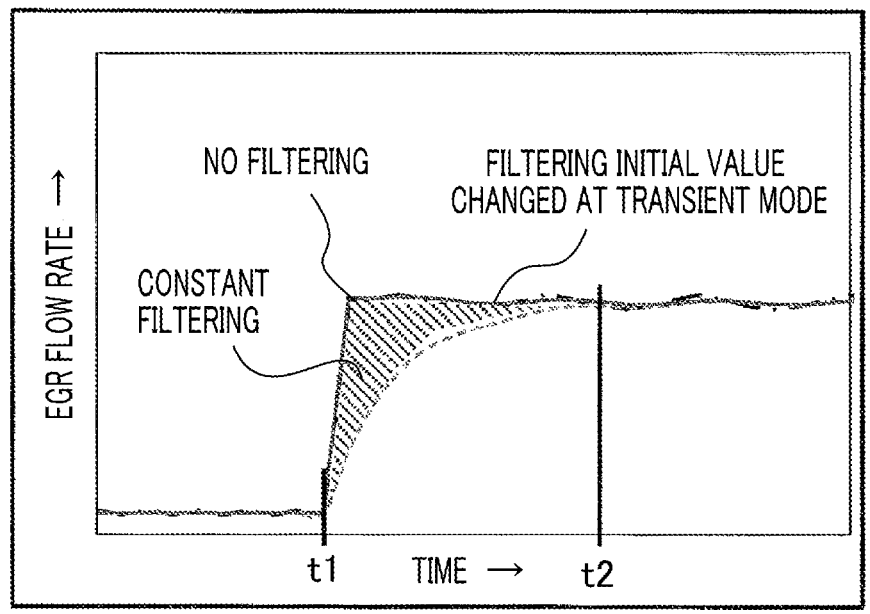
FIG. 14 is a graph representing the temporal transition of an EGR flow rate at a time when filtering processing is applied to the EGR flow rate in an internal combustion engine control apparatus according to Embodiment 1 of the present invention.

Even a sudden change of the flow rate represented in FIG. 14 can also be dealt with through the method described below. FIG. 14 is a graph representing the temporal transition of an EGR flow rate at a time when filtering processing is applied to the EGR flow rate in an internal combustion engine control apparatus according to Embodiment 1 of the present invention; the abscissa denotes the time and the ordinate denotes the EGR flow rate. In FIG. 14, the dashed line, the dotted line, and the solid line in the graph respectively denote the unfiltered EGR flow rate, the constantly filtered EGR flow rate, and the EGR flow rate at a time when the EGR flow rate utilized in the filtering processing is updated each time the EGR valve opening degree changes.

In the case where the filtering processing is constantly performed, a flow-rate difference, as indicated by the hatched area, from the unfiltered EGR flow rate occurs in a time between the time instant t1 and the time instant t2. A change in the EGR valve opening degree is detected, the EGR valve opening degree learning is prohibited when the EGR valve opening degree is changing, and the immediately previous EGR flow rate utilized in filtering processing is updated, so that the flow rate changes as indicated by the solid line; thus, the flow rate difference can be reduced and hence erroneous learning of the EGR valve opening degree at a time when the EGR valve opening degree is changing can be prevented.

As described above, an internal combustion engine control apparatus according to Embodiment 1 of the present invention makes it possible to estimate a cylinder intake air flow rate and a throttle flow rate through the S/D method, with an accuracy enough to appropriately control the internal combustion engine, either during steady driving or transient driving. Even when due to deposits such as soot and the like, the flow rate characteristic changes or even when due to a change over time, the EGR valve does not work, the EGR valve opening degree vs. flow rate characteristic (effective opening area characteristic) can be learned from an estimated cylinder intake air flow rate and an estimated throttle flow rate; therefore, the result of the learning makes it possible to accurately estimate the EGR flow rate. Respective control amounts can be set in accordance with the estimated EGR flow rate.

Within the scope of the present invention, the embodiments thereof can appropriately be modified or omitted.

The foregoing embodiment of the present invention is the one obtained by putting the following inventions into practice.

(1) An internal combustion engine control apparatus comprising:

a throttle valve provided in an intake pipe of an internal combustion engine;

an inner-intake-pipe pressure detection unit that detects, as an inner-intake-pipe pressure, a pressure in the intake pipe at the downstream side of the throttle valve;

a volume efficiency corresponding value calculation unit that calculates a volume efficiency corresponding value as an index that indicates an amount of air that flows from the intake pipe at the downstream side of the throttle valve into a cylinder of the internal combustion engine;

a cylinder intake air flow rate estimation unit that estimates a cylinder intake air flow rate utilized in controlling the internal combustion engine, based on the detected inner-intake-pipe pressure and the calculated volume efficiency corresponding value;

a throttle effective opening area calculation unit that calculates a throttle effective opening area corresponding to a throttle opening degree of the throttle valve, based on the estimated cylinder intake air flow rate;

a throttle opening degree learning unit that learns the relationship between the calculated throttle effective opening area and the throttle opening degree;

a throttle opening degree sensor that detects a throttle opening degree of the throttle valve;

a throttle flow rate estimation unit that estimates a throttle flow rate of air that passes through the throttle valve and is taken into the internal combustion engine, based on the detected throttle opening degree and the result of the throttle opening degree learning;

an exhaust gas recirculation path that connects the intake pipe at the downstream side of the throttle valve with an exhaust pipe of the internal combustion engine;

an exhaust gas recirculation valve that opens or closes the exhaust gas recirculation path so as to control a recirculation amount of exhaust gas in the internal combustion engine;

an exhaust gas recirculation amount calculation unit that calculates an exhaust gas recirculation amount, based on the estimated cylinder intake air flow rate and the estimated throttle flow rate;

an exhaust gas recirculation valve effective opening area calculation unit that calculates an exhaust gas recirculation valve effective opening area corresponding to an opening degree of the exhaust gas recirculation valve, based on the estimated exhaust gas recirculation amount;

an exhaust gas recirculation valve opening degree sensor that detects an opening degree of the exhaust gas recirculation valve; and an exhaust gas recirculation amount estimation unit that learns the relationship between the detected opening degree of the exhaust gas recirculation valve and the calculated effective opening area of the exhaust gas recirculation valve and estimates an exhaust gas recirculation amount, based on the relationship between a control exhaust gas recirculation valve effective opening area calculated based on the learning and an opening degree of the exhaust gas recirculation valve, wherein the exhaust gas recirculation amount estimated by the exhaust gas recirculation amount estimation unit is utilized in controlling the internal combustion engine.

In an internal combustion engine control apparatus according to (1), the relationship between an EGR valve opening degree and an effective opening area is learned based on the EGR effective opening area obtained from a preliminarily set relationship between the EGR valve opening degree and the effective opening area; thus, because even when the relationship between the EGR valve opening degree and the effective opening area changes, the right opening degree vs. effective opening area characteristic can be maintained, the EGR flow rate can accurately be estimated.

(2) The internal combustion engine control apparatus according to claim 1, further including:

an exhaust gas recirculation valve base effective opening area calculation unit that calculates an exhaust gas recirculation valve base effective opening area, based on the detected opening degree of the exhaust gas recirculation valve; and an exhaust gas recirculation valve effective opening area learning value calculation unit that calculates an exhaust gas recirculation valve effective opening area learning value, based on the calculated exhaust gas recirculation valve effective opening area and the calculated exhaust gas recirculation valve base effective opening area, wherein the exhaust gas recirculation valve effective opening area calculation unit calculates the exhaust gas recirculation valve effective opening area by use of the inner-intake-pipe pressure, the inner-exhaust-pipe pressure, the inner-exhaust-pipe sonic velocity, the inner-exhaust-pipe density, and the exhaust gas recirculation amount, and wherein calculation of the control exhaust gas recirculation valve effective opening area is performed by correcting the exhaust gas recirculation valve effective opening area, based on the calculated exhaust gas recirculation valve effective opening area learning value.

In an internal combustion engine control apparatus according to (2), an EGR effective opening area utilized in performing control is calculated by use of a learned EGR effective opening area learning value, so that the EGR flow rate can be estimated without utilizing an EGR flow rate obtained from the difference between a changeable cylinder intake air flow rate and a throttle flow rate.

(3) The internal combustion engine control apparatus according to any one of (1) and (2), wherein during steady driving of the internal combustion engine, the throttle flow rate estimation unit stops operation of the exhaust gas recirculation valve and then estimates the throttle flow rate, based on the detected throttle opening degree and the result of learning the throttle opening degree, and wherein during transient driving of the internal combustion engine, the throttle flow rate estimation unit stops the learning by the throttle opening degree learning unit and then estimates the throttle flow rate, based on the throttle opening degree and the result of learning the throttle opening degree.

In an internal combustion engine control apparatus according to (3), it is made possible to accurately calculate a throttle flow rate during transient change, which is required to calculate an EGR effective opening area learning value.

(4) The internal combustion engine control apparatus according to any one of (1) through (3), wherein the control exhaust gas recirculation valve effective opening area is calculated only when learning by the throttle opening degree learning unit has been completed.

In an internal combustion engine control apparatus according to (4), the relationship between the EGR valve opening degree and the effective opening area can accurately be learned, based on an accurate throttle flow rate at a time when the learning of the throttle opening degree has been completed.

(5) The internal combustion engine control apparatus according to any one of (1) through (4), wherein operation of the exhaust gas recirculation valve is kept stopped until learning by the throttle opening degree learning unit is completed.

In an internal combustion engine control apparatus according to (5), the throttle opening degree can accurately be learned, based on an accurate cylinder intake air flow rate at a time when the EGR is stopped.

(6) The internal combustion engine control apparatus according to any one of (2) through (5), further including a learning value storing unit that stores the learned value of the exhaust gas recirculation valve effective opening area in accordance with the opening degree of the exhaust gas recirculation valve, wherein the learning value storing unit stores the learned value of the exhaust gas recirculation valve effective opening area, as a map corresponding to an opening degree of the exhaust gas recirculation valve.

In an internal combustion engine control apparatus according to (6), the EGR effective opening area learning value is stored, as a map corresponding to the EGR valve opening degree, in a storage unit; thus, detailed correction can be performed and the EGR flow rate can accurately be calculated at a time when the learning is prohibited.

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine control apparatus comprising:

a throttle valve provided in an intake pipe of an internal combustion engine;

an inner-intake-pipe pressure detection unit that detects, as an inner-intake-pipe pressure, a pressure in the intake pipe at the downstream side of the throttle valve;

a volume efficiency corresponding value calculation unit that calculates a volume efficiency corresponding value as an index that indicates an amount of air that flows from the intake pipe at the downstream side of the throttle valve into a cylinder of the internal combustion engine;

a cylinder intake air flow rate estimation unit that estimates a cylinder intake air flow rate utilized in controlling the internal combustion engine, based on the detected inner-intake-pipe pressure and the calculated volume efficiency corresponding value;

a throttle effective opening area calculation unit that calculates a throttle effective opening area corresponding to a throttle opening degree of the throttle valve, based on the estimated cylinder intake air flow rate;

a throttle opening degree learning unit that learns the relationship between the calculated throttle effective opening area and the throttle opening degree;

a throttle opening degree sensor that detects a throttle opening degree of the throttle valve;

a throttle flow rate estimation unit that estimates a throttle flow rate of air that passes through the throttle valve and is taken into the internal combustion engine, based on the detected throttle opening degree and the result of the throttle opening degree learning;

an exhaust gas recirculation path that connects the intake pipe at the downstream side of the throttle valve with an exhaust pipe of the internal combustion engine;

an exhaust gas recirculation valve that opens or closes the exhaust gas recirculation path so as to control a recirculation amount of exhaust gas in the internal combustion engine;

an exhaust gas recirculation amount calculation unit that calculates an exhaust gas recirculation amount, based on the estimated cylinder intake air flow rate and the estimated throttle flow rate;

an exhaust gas recirculation valve effective opening area calculation unit that calculates an exhaust gas recirculation valve effective opening area corresponding to an opening degree of the exhaust gas recirculation valve, based on the estimated exhaust gas recirculation amount;

an exhaust gas recirculation valve opening degree sensor that detects an opening degree of the exhaust gas recirculation valve; and an exhaust gas recirculation amount estimation unit that learns the relationship between the detected opening degree of the exhaust gas recirculation valve and the calculated effective opening area of the exhaust gas recirculation valve, and estimates an exhaust gas recirculation amount, by calculating a control exhaust gas recirculation valve effective opening area based on the learned relationship and an opening degree of the exhaust gas recirculation valve, wherein the exhaust gas recirculation amount estimated by the exhaust gas recirculation amount estimation unit is utilized in controlling the internal combustion engine.

2. The internal combustion engine control apparatus according to claim 1, further including:

an exhaust gas recirculation valve base effective opening area calculation unit that calculates an exhaust gas recirculation valve base effective opening area, based on the detected opening degree of the exhaust gas recirculation valve; and an exhaust gas recirculation valve effective opening area learning value calculation unit that calculates an exhaust gas recirculation valve effective opening area learning value, based on the calculated exhaust gas recirculation valve effective opening area and the calculated exhaust gas recirculation valve base effective opening area, wherein the exhaust gas recirculation valve effective opening area calculation unit calculates the exhaust gas recirculation valve effective opening area by use of the inner-intake-pipe pressure, the inner-exhaust-pipe pressure, the inner-exhaust-pipe sonic velocity, the inner-exhaust-pipe density, and the exhaust gas recirculation amount, and wherein calculation of the control exhaust gas recirculation valve effective opening area is performed by correcting the exhaust gas recirculation valve effective opening area, based on the calculated exhaust gas recirculation valve effective opening area learning value.

3. The internal combustion engine control apparatus according to claim 1, wherein during steady driving of the internal combustion engine, the throttle flow rate estimation unit stops operation of the exhaust gas recirculation valve and then estimates the throttle flow rate, based on the detected throttle opening degree and the result of learning the throttle opening degree, and wherein during transient driving of the internal combustion engine, the throttle flow rate estimation unit stops the learning by the throttle opening degree learning unit and then estimates the throttle flow rate, based on the throttle opening degree and the result of learning the throttle opening degree.

4. The internal combustion engine control apparatus according to claim 1, wherein the control exhaust gas recirculation valve effective opening area is calculated only when learning by the throttle opening degree learning unit has been completed.

5. The internal combustion engine control apparatus according to claim 1, wherein operation of the exhaust gas recirculation valve is kept stopped until learning by the throttle opening degree learning unit is completed.

6. The internal combustion engine control apparatus according to claim 2, further including a learning value storing unit that stores the learned value of the exhaust gas recirculation valve effective opening area in accordance with the opening degree of the exhaust gas recirculation valve, wherein the learning value storing unit stores the learned value of the exhaust gas recirculation valve effective opening area, as a map corresponding to an opening degree of the exhaust gas recirculation valve.

* * * * *